United States Patent [19]

Suzuki

[11] Patent Number: 5,602,507
[45] Date of Patent: Feb. 11, 1997

[54] ADAPTIVE DEMODULATING METHOD FOR GENERATING REPLICA AND DEMODULATOR THEREOF

[75] Inventor: Hiroshi Suzuki, Yokosuka, Japan

[73] Assignee: NTT Mobile Communications Network Inc., Tokyo, Japan

[21] Appl. No.: 411,748

[22] PCT Filed: Nov. 4, 1994

[86] PCT No.: PCT/JP94/01862

§ 371 Date: Apr. 3, 1995

§ 102(e) Date: Apr. 3, 1995

[87] PCT Pub. No.: WO95/12926

PCT Pub. Date: May 11, 1995

[30] Foreign Application Priority Data

Nov. 5, 1993 [JP] Japan .................... 5-276723

[51] Int. Cl.⁶ .................... H03D 3/00; H04L 27/22
[52] U.S. Cl. .................... 329/304; 375/324; 375/329
[58] Field of Search .................... 329/304–310; 375/232–236, 324–333, 340–343, 346–350

[56] References Cited

U.S. PATENT DOCUMENTS

| | | | |
|---|---|---|---|
| 5,251,233 | 10/1993 | Labedz et al. .................... | 375/235 X |
| 5,363,408 | 11/1994 | Paik et al. .................... | 329/304 X |
| 5,367,536 | 11/1994 | Tsujimoto .................... | 329/304 X |
| 5,371,471 | 12/1994 | Chennakeshu et al. .................... | 329/304 |
| 5,394,110 | 2/1995 | Mizoguchi .................... | 329/304 |
| 5,450,445 | 9/1995 | Ushirokawa .................... | 375/324 |
| 5,471,504 | 11/1995 | Lee et al. .................... | 375/232 X |
| 5,490,169 | 2/1996 | Blackwell et al. .................... | 375/232 |

FOREIGN PATENT DOCUMENTS 5-110617  4/1993  Japan .
6-268540  9/1994  Japan .

OTHER PUBLICATIONS

K. Fukawa and H. Suzuki, "Blind Interference Cancelling Equalizer for Mobile Radio Communications", *IEICE Transactions on Communications*, vol. E77–B, No. 5, May 1994, pp. 580–588.

H. Yoshino et al., "Interference Canceling Equalizer (ICE) for Mobile Radio Communications" *IEEE International Conference on Communications*, May 1–5, 1994, pp. 1427–1432.

K. Fukawa and H. Suzuki, "Adaptive Equalization with RLS–MLSE for Frequency–Selective Fast Fading Mobile Radio Channels", *IEEE Communications Society*, IEEE Global Telecommunications Conference, Dec. 2–5, 1991, pp. 548–552.

*Primary Examiner*—David Mis
*Attorney, Agent, or Firm*—Pollock, Vande Sande & Priddy

[57] ABSTRACT

To prevent a coefficient vector for a modulated wave candidate of repeated identical codes from diverging, an error calculating part (36) calculates the difference between a vector $X(i)$ with elements of input signals $x(i)$ at N successive times and a vector $Y_m(i)$ of N replica signals $y_m(i)$ received from a transversal filter (34) to obtain an error vector $E_m(i)$, the square of the norm of which is supplied to a maximum likelihood sequence estimating portion (31), when signal estimation is carried out. In addition, a code sequence candidate $\{a_m\}$ is produced and a corresponding modulated wave candidate $s_m$ is generated. The filter (34) calculates the inner product of the modulated wave candidate $s_m$ and the coefficient vector $W_m(i-1)$ corresponding to each state to produce $y_m(i)$. $W_m(i-1)$ of each state is updated to $W_m(i)$ using an inner product vector of a generalized inverse matrix produced from $s_m$ corresponding to the state transition selected by the estimating portion (31) and $E_m(i)$.

22 Claims, 4 Drawing Sheets

ADAPTIVE DEMODULATING METHOD FOR GENERATING REPLICA AND DEMODULATOR THEREOF

TECHNICAL FIELD

The present invention relates to a demodulating method and a demodulator for demodulating an input signal using a replica that is adaptively generated for the transmitted signal from a transmission line which has varying transmission characteristics.

RELATED ART

Transmission characteristics of a communication transmission line, such as impulse response from a transmitter to a receiver, sometimes continuously vary largely. This frequently occurs in micro-wave radio transmission and mobile communications. In such a transmission line, when a signal is received in a relatively high noise level, a desired signal may contain a waveform distortion which varies with time. In addition, when varying interferences of the same channel and an adjacent channel are superimposed, the transmission performance will be remarkably impaired. Thus, the impairment due to such causes should be suppressed so as to realize a receiving system with high reliability.

To receive a transmission signal from a transmission line in which transmission characteristics vary, an adaptive receiver using an adaptive algorithm has been used.

In a transmission line which causes a varying distortion, adaptive equalizers have been used as the adaptive receivers. From the view point of the arrangements of the adaptive equalizers, the adaptive equalizers can be classified into linear equalizers and non-linear equalizers.

First, a linear equalizer will be described. FIG. 1 is a block diagram showing the configuration of a conventional linear equalizer. In the following description, a modulated received signal is represented in a complex notation. In the complex notation, a real part of an input signal $x(i)$ to the equalizer at a time point $i$ in discrete time at intervals of one symbol represents the amplitude of the in-phase component of the received signal. On the other hand, the imaginary part represents the amplitude of the quadrature component of the received signal. The input signal $x(i)$ is supplied from an input terminal 11 to a transversal filter 12 with M taps. By controlling tap coefficients $w_1(i), \ldots, w_M(i)$, the distortion of the input signal $x(i)$ is removed and the resultant signal is sent to a decision device 13. The decision device 13 outputs a decided signal $d(i)$ from an output terminal 12. The input signal and the output signal of the decision device 13 are supplied to an error calculating portion 15. The error calculating portion 15 calculates an error signal $e(i)$. The error signal is sent to a control portion 16. The control portion 16 updates the tap coefficients of the transversal filter 12 based on the error signal $e(i)$ and the input signal $x(i)$. The operation of the linear equalizer is described in, for example, J. G. Proakis, "Digital Communications," 2nd edition, McGraw-Hill, 1989.

A column vector of M tap coefficients $w_1(i), \ldots, w_M(i)$ which are supplied to the transversal filter 12 with M taps is denoted by a coefficient vector $W(i)$. A column vector of M input signals $x(i), \ldots, x(i-M+1)$ from a time point $i$ to a past time point $(i-M+1)$ corresponding to the respective tap positions is denoted by an input vector $Z(i)$. The input signal $x(i)$, which is an element of the vector $Z(i)$, is a superimposed signal of a directly received wave signal, a delayed received wave signal, an interfering received wave signal, and noise. Over the radio transmission line, the input signal $x(i)$ continuously varies. A coefficient vector $W(i-1)$ is successively updated to $W(i)$ based on the input vector $Z(i)$ and the error signal $e(i)$.

For example, when the input vector $Z(i)$, which is the M input signals from the time point $i$ to the time point $(i-M+1)$, is applied to the transversal filter 12 at the time point $i$, the output $s(i)$ of the transversal filter 12 can be given by the following linear expression:

$$w_1^*(i)\times(i)+w_2^*(i)\times(i-1)+\ldots+w_M^*(i)\times(i-M+1) = s(i) \quad (01)$$

where $*$ represents a complex conjugate. Having obtained a plurality of sets of measured values $x(i), \ldots, x(i-M+1)$ each set is substituted into Expression (01). An error $e(i)$ between each of the resultant $s(i)$ of the plurality of expressions and the output of the decision device 13 is obtained and the coefficients $w_1(i), \ldots, w_M(i)$ of Expression (01) are determined by the least square method so that the sum of the squares of the absolute values of the errors $e(i)$ becomes minimum.

Using an input vector $Z^H(i)=(x^*(i), \ldots, x^*(i-M+1))$ and a coefficient vector $W^H(i)=(w_1^*(i), \ldots, w_M^*(i))$, Expression (01) is represented by the following expression:

$$W^H(i)Z(i)=s(i) \quad (02)$$

where $^H$ represents a complex conjugate transposition. When K sets of input signals $x(i-k), x(i-1-k), \ldots, x(i-M+1-k)$, where $k=0, 1, \ldots, K-1$, that are sets of measured values are substituted into Expression (02), K linear expressions can be expressed by a matrix form $W^H(i)X^H(i)=S^H(i)$ namely, $X(i)W(i)=S(i)$, where $X^H(i)=(Z(i), Z(i-1), \ldots, Z(i-K+1)$; $S^H(i)=(s(i), \ldots, s(i-K+1)$; and K is an integer equal to or greater than one. Forming a column vector by an array of M decision signals $d(i)$ as a vector $D^H(i)=(d(i), d(i-1), \ldots, d(i-K+1))$ and further forming a column vector $E(i)=D(i)-S(i)$, the norm $J(i)=E^H(i)E(i)$ can be defined. Using $J(i)$ as a cost function, the following equation is obtained from a partial differential equation $\partial J(i)/\partial W^*(i)=0$:

$$X^H(i)X(i)W(i)=X^H(i)D(i) \quad (03)$$

where $X^H(i)X(i)$ represents an auto-correlation matrix of the input signal; and $X^H(i)D(i)$ represents a cross-correlation vector between the input signal and the decision signal. Denoting $X^H(i)X(i)$ and $X^H(i)D(i)$ by $R(i)$ and $V(i)$, respectively, Expression (03) becomes the following expression:

$$R(i)W(i)=V(i) \quad (04)$$

Thus, in the system shown in FIG. 1, $W(i)$ is a solution according to the method of least squares. The auto-correlation matrix $R(i)$ obtained from the input vector $Z(i)$ with M elements is an M-dimensional square matrix. The cross-correlation vector $V(i)$ between the input vector $Z(i)$ and the decision output signal vector $D(i)$ is an M-dimensional vector. Using the matrix $R(i)$ and the vector $V(i)$, the coefficient vector is represented by $W(i)=R^{-1}(i)V(i)$. In other words, the coefficient vector $W(i)$ is a solution of the normal equation $R(i)W(i)=V(i)$ and can be solved by the method of least squares. When an inverse matrix of $R(i)$ exists, $R(i)$ is referred to as a regular matrix.

However, the inverse matrix $R^{-1}(i)$ of the auto-correlation matrix $R(i)$ does not always exist. Thus, there has been a problem that when such a wave having an auto-correlation matrix with a rank less than M is received, for example, a received wave modulated with a succession of identical codes is received in a low noise condition, all the elements of R(i) result in the same value, therefore, the inverse matrix $R^{-1}(i)$ diverges and thereby the coefficient vector W(i) diverges.

Adaptive algorithms that recursively obtain solutions of the equations are well-known. Examples of such adaptive algorithms are Kalman filter, RLB, and LMB. For details of such adaptive algorithms, refer to Haykin, "Adaptive Filter Theory", Prentice-Hall, 1991. In these methods, when the auto-correlation matrix is not regular, or singular, the solution diverges.

As a method for obtaining a solution that does not diverge even when the auto-correlation matrix R(i) is singular, a technique using a generalized inverse matrix is known. For the generalized inverse matrix, refer to A. Albert, "Regression and the Moore-Penrose Pseudoinverse", Academic Press, 1972. Using the generalized inverse matrix, the solution can be prevented from diverging even when the auto-correlation matrix R(i) is not regular. However, the solution W(i) becomes a minimum norm solution in which the norm $\|W(i)\|$ of the tap coefficient vector becomes minimum and as the time i passes, since the solution of the minimum norm is not identical at each time point, the solution does not always converge gradually to the true solution.

When the auto-correlation matrix R(i) is singular, an orthogonal projection method using the Moore-Penrose generalized inverse matrix is known as a method for approaching to the true solution asymptotically. This method is described in K. Ozeki and T. Umeda, "An adaptive filtering algorithm using an orthogonal projection to an Affine subspace and its properties," Trans. IECE of Japan, vol. J67-A, no. 2, pp. 126–132, February 1982. However, in a transmission line in which transmission characteristics vary, since the input vector Z(i) changes with time, the auto-correlation matrix R(i) obtained from X(i) also varies, and therefore the Moore-Penrose generalized inverse matrix should be successively updated. Since this update processing requires a large amount of calculation, this method is difficult to use for realtime processing.

Although adaptivity of the linear equalizers have been improved as described above, there is still a problem that sufficient equalizing effects cannot be obtained under such a distortion condition with the non-minimum phase in which the level of the delayed wave is larger than that of the direct wave.

On the other hand, non-linear equalizer configurations have been studied in order to obtain enough equalizing effects even under a distortion condition with the non-minimum phase. FIG. 2 shows a configuration of a demodulator that is constructed as a non-linear equalizer. An input signal x(i) is supplied from an input terminal 11 to a subtractor 17, in which a difference between the input signal x(i) and a replica signal $y_m(i)$ supplied from a transversal filter 18 is calculated to obtain an error signal $e_m(i)$. A squarer 19 calculates the square of the absolute value of the error signal $e_m(i)$, and the calculated result is sent to a maximum likelihood sequence estimating circuit 21 to estimate a signal. The maximum likelihood sequence estimating circuit 21 outputs a code sequence candidate $\{a_m\}$ where m represents a state transition candidate number. A modulating circuit 22 modulates the code sequence candidate $\{a_m\}$ in the same manner as that in the transmitter and outputs a modulated wave candidate $s_m$, for example, a complex symbol candidate. The modulated wave candidate $s_m$ is sent to the transversal filter 18 with M taps, where a replica signal $y_m(i)$ of a desired signal is produced.

The state at the time point i is defined by a sequence of M−1 complex symbol candidates s(i−1), s(i−2), . . . , s(i−M+1). Each complex symbol candidate has a transition state corresponding to a code sequence candidate $\{a_m\}$.

The candidates $\{a_m\}$ from the maximum likelihood sequence estimating circuit 21 exist in correspondence to all state transitions at each state. Thus, for the same input signal x(i) the maximum likelihood sequence estimating circuit 21 performs the above described calculation for all candidates whose number is the product of the number of states and the number of state transitions. The maximum likelihood sequence estimating circuit 21 selects a most likely one of a plurality of state transitions merging into the present time point from the previous time point based on the associated error signals. The control circuit 23 updates the tap coefficients of the transversal filter 18 using both the corresponding error signal $e_m(i)$ and the modulated wave candidate $s_m$ alone the most likelihood state transition selected for each state at the present time point. The operation of the non-linear equalizer is described in, for example, K. Fukawa and H. Suzuki, "Adaptive equalization with RLS-MLSE for frequency-selective fast fading mobile radio channels," IEEE Globecom '91, pp. 16.6.1–16.6.5, December 1991 and H. Yoshino, K. Fukawa, and H. Suzuki, "Adaptive equalization with RLS-MLSE for fast fading mobile radio channels," IEEE Inter, Symp. circuit and Sys., pp. 501–504, San Diego, May, 1992. In this manner, in the non-linear equalizer shown in FIG. 2, the characteristics of the transversal filter 18, or the tap coefficients $w_1(i), \ldots, w_M(i)$, are controlled so as to simulate the transmission characteristics of the transmission line.

Let $W_m(i)$ represent a coefficient vector of tap coefficients from $w_{m,1}(i)$ to $w_{m,M}(i)$ of the transversal filter 18 with M taps for the modulated wave candidate $s_m(i)$, and $S_m(i)$ be a modulated wave candidate vector of modulated wave candidates from $s_m(i)$ to $s_m(i-M+1)$ over past M−1 duration. A coefficient vector $W_m(i-1)$ is updated to $W_m(i)$ by using a modulated wave candidate vector $s_m(i)$ and the error signal $e_m(i)$. When the system ideally operates, the coefficient vector $W_m(i)$ is the solution of the method of least squares. The coefficient vector $W_m(i)$ can be represented by $W_m(i) = R_m^{-1}(i)V_m(i)$ using an auto-correlation matrix $R_m(i)$ obtained from the modulated wave candidate vector $S_m(i)$ and a cross-correlation vector $V_m(i)$ between the modulated wave candidate vector $S_m(i)$ and the input signal x(i). However, the inverse matrix $R_m^{-1}(i)$ of the auto-correlation matrix has been given a condition that $R_m(i)$ should be regular. Thus, when a modulated wave candidate has the same successive codes, the rank of the auto-correlation matrix of the modulated wave candidate vector $S_m(i)$ becomes lower than M, causing a problem that the coefficient vector $W_m(i)$ diverges.

As one type of non-linear equalizer, a blind Viterbi equalizer has been known which does not require a training signal. The operation of this equalizer is described in, for example, Y. Furuya, A. Ushirokawa, H. Isa, and Y. Satoh, "A study of blind Viterbi equalization algorithm", 1991 Spring Nat. Convo of IEICE, A-141, March 1991. Even in this eqalizer, for a modulated wave candidate with the same successive codes, the coefficient vector diverges. Therefore, in this equalization, when a modulated wave candidate with the same successive codes is selected, the coefficient vector is not updated.

A method for using a generalized inverse matrix for the non-linear equalizer is described in Y. Sato, "Blind equalization and blind sequence estimation," IEICE Trans. Commun., vol. E77-B, no. 5, pp. 525–556, May 1994. As described in this reference, in the conventional method, all solutions take the minimum norm solution. As will be described later, there is a problem that the minimum norm solution depends on the data sequence being transmitted, and the solution does not always converge to the single solution.

Other than the adaptive equalizer there are various adaptive receivers, such as interference cancelers or diversity arrangement of equalizers and cancelers. These adaptive receivers can be also classified into the linear and non-linear types as described in (1) H. Yoshino and H. Suzuki, "Interference cancelling characteristics of DFE transversal combining diversity in mobile radio environment—comparisons with metric combining schemes—," Trans. IEICE of Japan vol. 76-B-II, no. 7, pp. 582–595, July 1993, (2) H. Yoshino, K. Suzuki and H. Suzuki, "Interference cancelling equalizer (ICE) for mobile radio communications", IEEE Inter. Conf. Commun., pp. 1427–1432, May 1994, and (3) K. Fukawa and H. Suzuki, "Blind interference cancelling equalizer for mobile radio communications", IEICE Trans. commun., vol. E77-B, no. 5, pp. 580–588, May 1992. However, these adaptive receivers have the same drawbacks as those described above.

An object of the present invention is to provide an adaptive demodulating method and a demodulator thereof for generating a replica corresponding to an input signal without causing divergence of a coefficient vector even when a transversal filter is supplied with a modulated wave candidate of the same successive codes and, instead, gradually converging to a true solution.

DISCLOSURE OF THE INVENTION

The adaptive demodulator according to the present invention includes: a maximum likelihood sequence estimating means for estimating a maximum likelihood sequence based on an error signal sequence, a replica generating means for calculating the inner product of a coefficient vector corresponding to each state of the maximum likelihood sequence estimating means and a modulated wave candidate vector corresponding to a state transition of each state of said maximum likelihood sequence estimating means to produce a replica, a difference calculating means for calculating the difference between a replica vector with elements of a sequence of the generated replicas and an input signal vector with elements of a sequence of the input signals to produce an error vector, and an updating means for updating the coefficient vector by using a generalized inverse matrix generated from a modulated wave candidate corresponding to the signal sequence selected by the maximum likelihood sequence estimating means using the error vector.

The adaptive demodulating method according to the present invention includes the steps of: (1) causing maximum likelihood sequence estimating means to output a signal sequence candidate corresponding to a state transition for each state to replica generating means, (2) causing the replica generating means to generate a modulated wave candidate vector from a signal sequence candidate corresponding to the state transition and calculate the inner product of the modulated wave candidate vector and a coefficient vector corresponding to each state of the maximum likelihood sequence estimating means, (3) causing error calculating means to generate a replica vector with elements of a sequence of generated replicas and an input signal vector with elements of a sequence of input signals and calculate the difference between these vectors, to produce an error vector, (4) causing the maximum likelihood sequence estimating means to select a most likely state transition candidate based on the error signal sequence corresponding to the state transition of each state, and further output a decision signal according to the most likely state, and (5) causing updating means to calculate the inner product of a generalized inverse matrix generated from a modulated wave candidate corresponding to the state transition selected by the maximum likelihood sequence estimating means using the error vector, and update the coefficient vector of each state with the inner product.

The adaptive demodulator and demodulating method according to the present invention are different from the conventional maximum likelihood sequence estimating demodulator and demodulating method in the following respects.

(1) The conventional error calculating means calculates the difference in scalar quantity and therefore the error is also in scalar quantity. On the other hand, according to the present invention, the difference is calculated in vector quantity and therefore the error is also in vector quantity. In the special case where the number of vector elements is one, the error calculating means of the present invention becomes equivalent to the conventional error calculating means.

(2) The conventional maximum likelihood sequence estimating means estimates a state by using an error in scalar quantity. On the other hand, in the present invention, state estimation is performed using an error in vector quantity. In the special case where the number of vector elements is one, the state estimating means of the present invention becomes equivalent to the conventional state estimating means.

(3) The conventional updating means obtains a coefficient vector of each state as the minimum norm solution of the normal equation or as a converging solution of a recursive updating expression like a Kalman filter, RLS, or LMS. Unlike the conventional updating means, the updating means of the present invention updates the coefficient vector for each state by using a generalized inverse matrix.

BEST MODES FOR CARRYING OUT THE INVENTION

Figure 1:
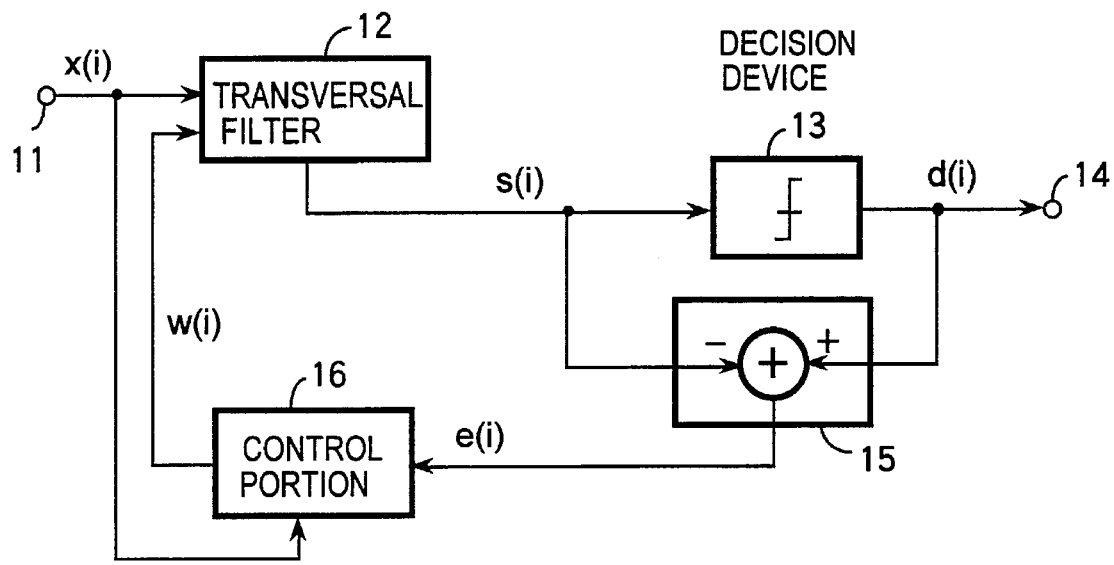
FIG. 1 is a block diagram showing a demodulator constructed as a conventional linear equalizer.

FIG. B shows an embodiment of the present invention. An adaptive demodulator of this embodiment is constructed as a non-linear equalizer using a maximum likelihood sequence estimation as with the related art reference shown in FIG. 2. The adaptive demodulator shown in FIG. 3 comprises a maximum likelihood sequence estimating portion 31, an error calculating portion 32, a squarer 37, a replica generating portion 38, and an updating portion 21. The error calculating portion 32 comprises an input signal memory BB, a replica memory 35, and a subtractor 96. The input signal memory 33 is constructed of, for example, M stages of shift register that stores complex conjugate of M input signals x(i), x(i–1), . . . , x(i–M+1) from a present time point i to a past time point (i–M+1) as a column vector X(i). The replica memory 35 is constructed of M stages of shift registers that holds M replicas $y_m(i)$, $y_m(i-1)$, . . . , $y_m(i-M+1)$ from the time point i to the past time point (i–M+1) generated by the replica generating portion 38 as a column vector $Y_m(i)$. The subtractor 36 calculates the difference between the input vector X(i) and the replica vector $Y_m(i)$ stored in the memories 33 and 35. An output error vector $E_m(i)$ of the subtractor 36 is supplied to the squarer 37, which calculates the square of the absolute value of the output error vector $E_m(i)$. The output of the squarer 37 that is a value corresponding to the likelihood is sent to the maximum likelihood sequence estimating portion 31.

Figure 2:
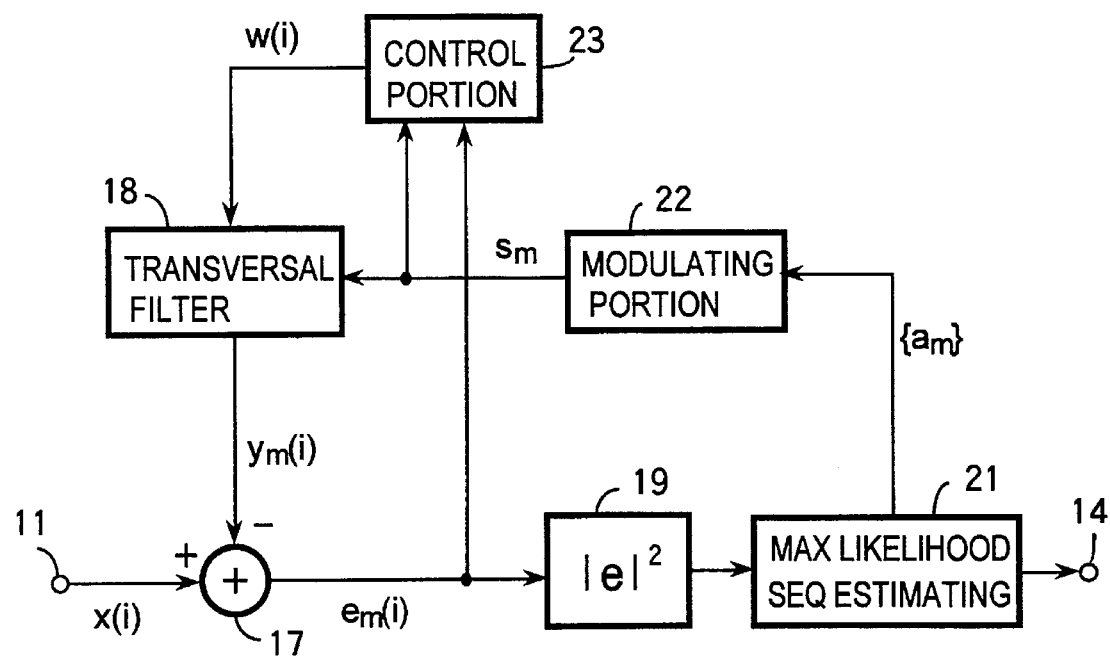
FIG. 2 is a block diagram showing a demodulator constructed as a conventional non-linear equalizer.

As has been well-known, the operation of the maximum likelihood sequence estimating portion 31 can be described by its state. For example, in the case where the number of taps M of the transversal filter 34 is two (namely, one symbol delay), and the modulating portion 39 carries out QPBK modulation, there are four states. FIG. 2, is a trellis diagram showing states $S_1$, $S_2$, $S_3$, and $S_4$. From each state of $S_1$, $S_2$, $S_3$, and $S_4$ at a time point (i–1) there can be a transition to any one of the states $S_1$, $S_2$, $S_3$, and $S_4$ at a time point i. At the time point (i–1), a coefficient vector $W_m(i-1)$ corresponding to each state m is set to the transversal filter 32.

An input signal x(i) is supplied from an input terminal 11 to the error calculating portion 32. A sequence of input signals at consecutive N time points are stored in the input signal memory 33. The input signal memory 33 outputs an input signal vector X(i) with elements of the sequence of the input signals x(i) given by the following expression.

$$X^H(i)=(x(i), x(i-1), \ldots , x(i-M+1)) \quad (1)$$

As is clear from Expression (1), the definition of the input signal vector X(i) differs from that of the input vector Z(i) of the above described linear equalizer. Each replica signal $y_m(i)$ output from the transversal filter 32 is supplied to the replica memory 35, thus, a sequence of N replica signals are stored in the replica memory 35 of the error calculating portion 32. The replica memory 35 outputs a replica vector $Y_m(i)$ with elements of the sequence of the replica signals $y_m(i)$. The replica signals $y_m(i)$ is given by the following expression:

$$Y_m^H(i)=(y_m(i), y_m(i-1), \ldots , y_m(i-M+1))$$

The subtractor 36 calculates the difference between the input signal vector X(i) and the replica vector $Y_m(i)$ and outputs an error vector $E_m(i)$.

The square of the norm of the error vector $E_m(i)$ is calculated by the squarer 37 and the result is provided to the maximum likelihood sequence estimating portion 31. The maximum likelihood sequence estimating portion 31 estimates a signal and the estimated signal is output from an output terminal 14. The maximum likelihood sequence estimating portion 31 outputs a code sequence candidate $\{a_m\}$ to the replica generating portion 38. The replica generating portion 38 consists of a modulating portion 39 and the transversal filter 32. The modulating portion 39 performs the same modulation with the code sequence candidate $\{a_m\}$ as the transmitting side does and outputs a modulated wave candidate $\{s_m\}$. The modulated wave candidate $\{s_m\}$ is applied to the transversal filter 32. The transversal filter 34 calculates the inner product (convolution) of the modulated wave candidate $\{a_m\}$ and the coefficient vector $W_m(i-1)$ corresponding to each state transition candidate m at the maximum likelihood sequence estimating portion 31 to produce a replica signal $y_m(i)$.

Figure 4:
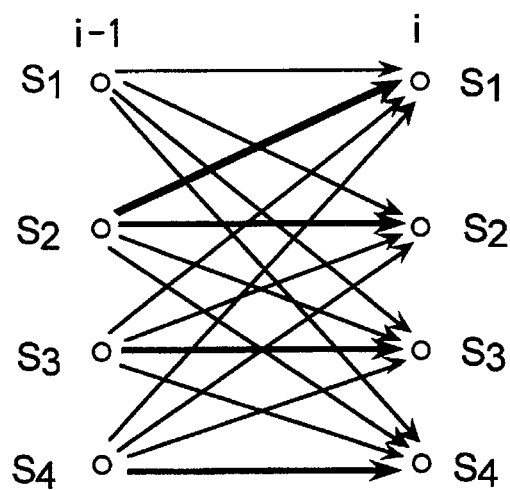
FIG. 4 is a schematic diagram showing a trellis of a maximum likelihood sequence estimating portion.

As shown in FIG. 4, to each of the states $S_1$ to $S_4$ at the time point i, there are state transitions from the respective states at the time point (i–1). Thus, four state transitions are merging. From these four state transitions, one state transition with the maximum likelihood, or a state transition with small $\|E_m(i)\|^2$, is selected. In FIG. 2, selected state transitions to each state at the time point i are denoted by thick lines. The updating portion 21 according to the present invention updates the coefficient vector $W_m(i-1)$ for each state to $W_m(i)$ by calculating an inner product vector of a generalized inverse matrix, which is generated from the modulated wave candidate $\{s_m\}$ corresponding to the state transition selected by the maximum likelihood sequence estimating portion 31, and the error vector $E_m(i)$. Since the maximum likelihood sequence estimating portion 31 outputs candidates $\{a_m\}$ corresponding to the number of state transitions at each state, the calculations must be carried out corresponding state number and state transition number for the single input signal x(i).

Practically, W(i) is updated as follows. First, the principle of the updating algorithm will be described. A modulated wave candidate vector (complex symbol candidate vector)

$$S_m^H(i)=(s_m^*(i), (s_m^*(i-1), \ldots , s_m^*(i-N+1))$$

is generated corresponding to a state transition candidate m corresponding to a code sequence candidate $\{a_m\}$ selected by the maximum likelihood sequence estimating portion In addition, a modulated wave candidate matrix $$A_m^H(i)=(S_m(i), S_m(i-1), \ldots , S_m(i-N+1))$$

is generated corresponding to N modulated wave candidate vectors over N consecutive time points, where N represents an integer that is 1 or greater. Using $A_m(i)$, an auto-correlation matrix $R_m(i)$ of the modulated wave candidate and cross-correction vector $V_m(i)$ between the modulated wave candidate and the input signal are calculated as follows:

$$R_m(i)=A_m^H(i)A_m(i) \quad (2)$$

$$V_m(i)=A_m^H(i)X(i) \quad (3)$$

$R_m(i)$ and $V_m(i)$ are calculated for each state transition candidate m.

A vector $W_m(i)$ is obtained by solving the normal equation expressed by $R_m(i)$ and $V_m(i)$ as $$R_m(i)W_m(i)=V_m(i)$$

Supporting that when $W_r$ is an arbitrary vector having the same dimensions as $W_m(i)$, a general solution of $W_m(i)$ is given by the following expression.

$$W_m(i)=R_m^+(i)V_m(i)+(I_M-R_m^+(i)R_m(i))W_r \qquad (4)$$

where $I_M$ represents an M by M unit matrix. The proof of this expression is described in, for example, the above described reference written by A. Albert.

In Expression (4), the Moore-Penrose generalized inverse matrix $R_m^+(i)$ should be calculated based on $R_m(i)$. Several mathematical methods are known for calculating $R_m^+(i)$ from $R_m(i)$. For example, in Chapter 5 of the reference written by A. Albert, four methods are described in detail.

The first term in the right hand side of Expression (4), which is a solution obtainable by assuming $W_r=0$, is the particular solution equivalent to the minimum norm solution. For a state transition candidate m which renders $R_m(i)$ regular, $R_m^+(i)=R_m^{-1}(i)$ holds and the second term of the right side of Expression (4) is cancelled; therefore, the minimum norm solution of the first term becomes the solution. However, since the signal sequence is transmitted at random, $R_m^+(i)$ does not always become $R_m^{-1}(i)$. In the conventional method which allows only the minimum norm solution, there is a drawback that a true solution cannot be obtained because $R_m^+(i)$ changes according to the random signal sequence. In such a case, by using the general solution, $W_m(i)$ can be obtained in the following manners:

First Updating Method

For arbitrary vector Wr with the same dimensions as $W(i)$, Expression (4) holds. Equating Wr with $W_m(i-1)$, Expression (4) becomes the following recursive expressions:

$$W_m(i)=W_m(i-1)+R_m^+(i)\Delta_m(i) \qquad (5)$$

$$\Delta_m(i)=V_m(i)-R_m(i)W_m(i-1) \qquad (6)$$

Expression (6) represents a prediction error. In Expression (5), $W_m(i-1)$ is corrected by using the prediction error and updated to $W_m(i)$.

The cross-correlation vector $V_m(i)$ of Expression (6) is calculated by Expression (3) using the input signal vector $X(i)$ and the modulated wave candidate transposed matrix $A_m^H(i)$. In Expressions (5) and (6), the auto-correlation matrix $R_m(i)$, defined by Expression (2) using the modulated wave candidate, and the generalized inverse matrix $R_m^+(i)$ are obtained for the state transition m, which means that these matrices are not based on actual received input signal. Instead, they are based upon the auto-correlation function of a pure signal component free of fluctuation of transmission characteristics and noise addition. Thus, $R_m(i)$ and $R^+(i)$ are given only by the knowledge of each state, and they can be calculated beforehand corresponding to the state transition candidate m. Then, the matrices $R_m(i)$ and $R_m^+(i)$ calculated beforehand may be prestored in a matrix memory 41M of the updating portion 41 in correspondence with the state transition candidate m, and each time a code sequence candidate is designated by the maximum likelihood sequence estimating portion 31, a corresponding state transition candidate m is provided to the updating portion 41 to read out the corresponding auto-correlation matrix $R_m(i)$ and the generalized inverse matrix $R_m^+(i)$ from the matrix memory 41M and calculate the tap coefficient vector $W_m(i)$ by expressions (5) and (6). This method tremendously reduces the calculation amount necessary for the demodulation processing.

The above described first updating algorithm holds for arbitrary N for the dimension M. When N=1, $A_m^H(i)=S_m(i)$ and $A_m(i)=S_m^H(i)$ are obtained and, therefore, $R_m(i)=S_m(i)S_m^H(i)$ and $V_m(i)=S_m(i)X(i)$ are obtained. In this case, either of the input signal memory 33 and the replica memory 35 can consist of one stage, and the hardware can be simplified.

Second Updating Method

Applying the following matrix equations, $$R_m^+(i)V_m(i)=A_m^+(i)X(i) \qquad (7)$$

$$R_m^+(i)R_m(i)=A_m^+(i)A(i) \qquad (8)$$

to the expressions (5) and (6), the second updating algorithm is given by $$W_m(i)=W_m(i-1)+A_m^H(i)\Delta'_m(i) \qquad (9)$$

$$\Delta'_m(i)=X(i)-A_m(i)W_m(i-1) \qquad (10)$$

Since this updating method does not require calculations of $R_m(i)$ and $V_m(i)$, the calculation can be simplified. The matrix $A_m(i)$ and its generalized inverse matrix $A_m^+(i)$ calculated beforehand corresponding to the state transition candidate m are prestored in the matrix memory 41M, and can be read out therefrom upon request, which results in reduction of the calculation amount. The right hand side of Expression (10) is the same as the output $E_m(i)$ of the subtractor 36 shown in FIG. 3. Thus, when the output $E_m(i)$ of the subtractor 36 is used as denoted by a broken line instead of calculating it by Equation (10), the calculation amount can be further reduced. In this case, since $A_m(i)$ is not used, it suffices only to prestore $A_m^+(i)$ in the matrix memory 41M.

Third Updating Method

The third updating algorithm introduces a step size μ into Expression (5) of the first updating method as follows:

$$W_m(i)=W_m(i-1)+\mu R_m(i)\Delta_m(i) \qquad (11)$$

The value of the step size μ is positive and around 1. When the value of μ increases, the coefficient vector $W_m(i)$ can quickly converge; however, the convergence error becomes large. On the contrary, when the value of μ decreases, the coefficient vector $W_m(i)$ slowly converges. Thus, depending on the application, it is possible to adjust the convergence characteristics of the coefficient vector. In this case, the calculation amount of the demodulation decreases if calculated $R_m(i)$ and $\mu R_m^+(i)$ are calculated beforehand and prestored in the matrix memory 41M. Similarly, for Expression (9) of the second updating method, the step size μ can be introduced as follows:

$$W_m(i)=W_m(i-1)+\mu A_m^+(i)\Delta'_m(i) \qquad (12)$$

In the above described updating algorithms, the auto-correlation matrix $R_m(i)$ and the cross-correlation vector $V_m(i)$ have been defined as $R_m(i)=A_m^H(i)A_m(i)$ and $V_m(i)=A_m^H(i)X(i)$, respectively. Whereas they can be exponentially weighted by defining as $R_m(i)=A_m^H(i)\Lambda A_m(i)$ and $V_m(i)=A_m^H(i)\Lambda X_m(i)$, where $\Lambda$ represents a diagonal matrix $\Lambda=\text{diag}(1,\lambda,\ldots,\lambda^{N-1})$; $\lambda$ represents a constant forgetting factor satisfying $0<\lambda<1$. In such a case, the coefficient vector can be updated by Expression (4), or by the first updating method according to Expressions (5) and (6). In the second updating method, however Expressions (7) and (8) hold only when the rank of $A_m(i)$ is N and $N \leq M$, which cannot hold, generally. Consequently, only when Expressions (7) and (8) hold, the coefficient vector can be updated by Expressions (9) and (10).

Figure 5:
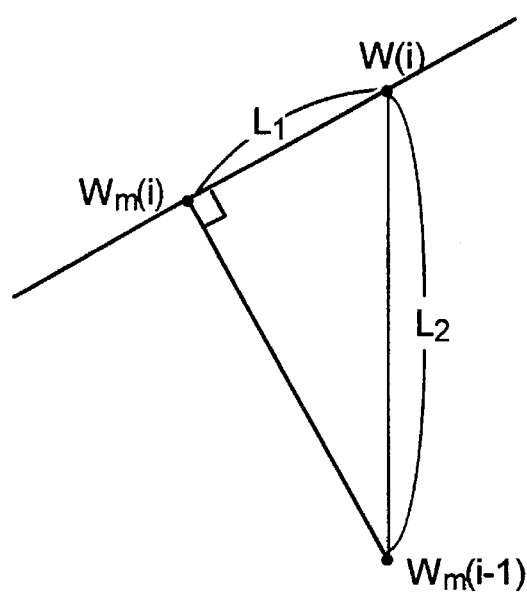
FIG. 5 is a schematic diagram for explaining update of coefficient vector.

The vector $W_m(i)$ updated by the above expression is not the minimum norm solution, i.e., not a solution which makes $\|W_m(i)\|$ minimum, but a solution which makes the difference norm $\|W_m(i)-W_m(i-1)\|$ or equivalently $\|W_m(i)-W_r\|$ minimum. This means that, in the updating algorithm with the true solution denoted by W(i), a straight line that connects the vector $W_m(i-1)$ and the vector $W_m(i)$ in the vector space becomes perpendicular to the straight line that connects the vector $W_m(i)$ and the vector W(i) as shown in FIG. 5. Therefore, let the distance from W(i) to $W_m(i)$, and the distance from W(i) to $W_m(i-1)$ be represented by $L_1=\|W(i)-W_m(i)\|$ and $L_2=\|W(i)-W_m(i-1)\|$, respectively, the relation $L_1 \leq L_2$ can be derived by applying the Pythagorean theorem. Therefore, while a randomly modulated signal is being received, as the time i passes, the coefficient vector always approaches the true solution. This characteristic is effectively applicable to blind type equalizers and the like.

Since a code sequence corresponding to a state transition m for each state is usually fixed, the modulated wave candidate vector $S_m(i)$ for each state transition is fixed. In other words, the modulated wave candidate matrix $A_m(i)$ can be regarded as a constant matrix $A_m$ that does not vary with time. Thus, the updating portion 41 can calculate the generalized inverse matrix $R_m^+(i)$ or $A_m^+$ beforehand and prestores it in the matrix memory 41M of the updating portion 41. In the actual applications, since the matrix prestored in the matrix memory 41M can be used for the calculation, the calculation amount and the processing time can be reduced. This property is remarkably different from the above described orthogonal projection method for the linear equalizer in which a received signal containing noises is fed into the transversal filter. Although the expressions can be modified in various manners associated with the above described three algorithms, those matrices which can be calculated from $A_m(i)$, like $R_m^+, R_m$, and so forth may be calculated beforehand and prestored in the matrix memory 41M.

In the non-linear equalizer, as the delay time increases, the number of states and processing amount exponentially increase. To solve such a problem, various state reducing methods have been studied as in A. Duel-Hallen, C. Heegard, "Delayed decision feedback sequence estimation," IEEE Trans. Communi., vol. 38, no. 5, pp. 228–236, May 1986. Like this reference, the maximum likelihood sequence estimation with reduced state number refers to a code sequence stored in a path memory to define effective states. Thus, it is necessary to calculate, beforehand, a generalized inverse matrix having incorporated therein the code sequence stored in the path memory. This concept can be applied to an adaptive demodulator constructed by a decision feedback equalizer (DFE) shown in FIG. 6.

Figure 6:
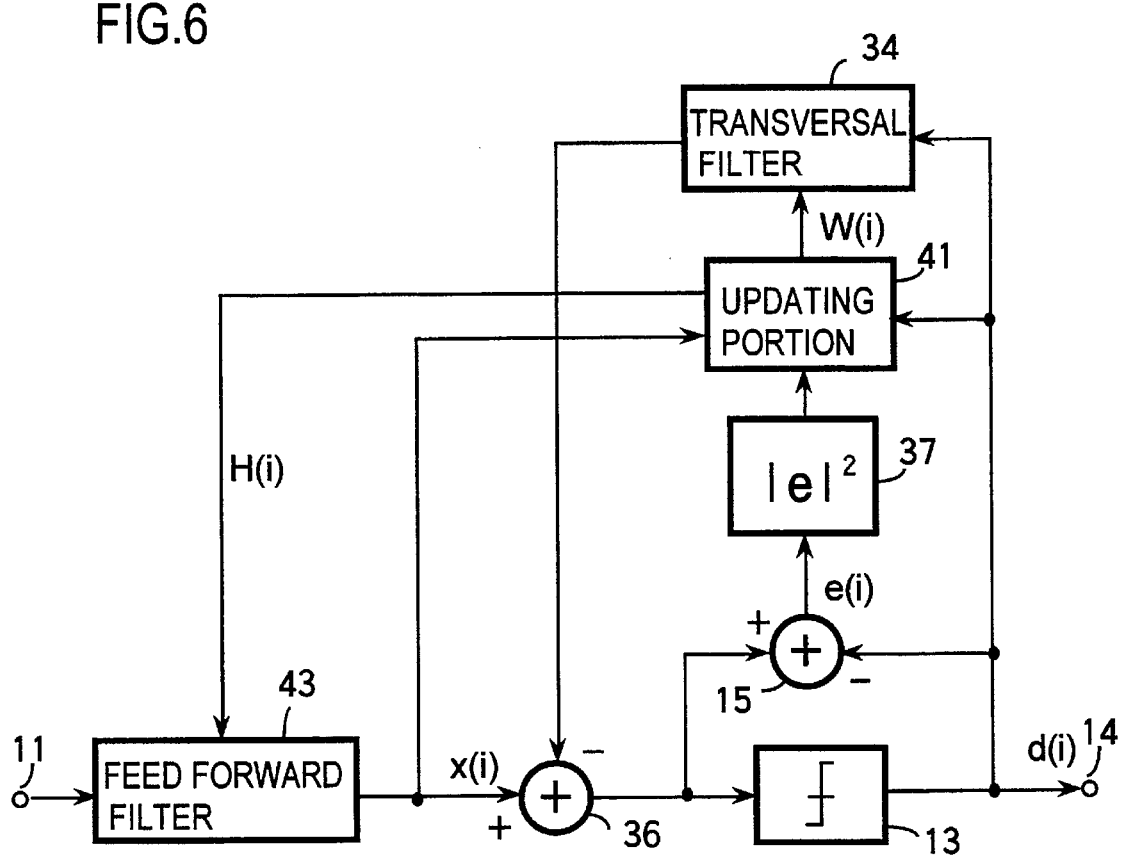
FIG. 6 is a block diagram showing a configuration of an adaptive demodulator according to the present invention in the case of using decision feedback.

In the embodiment shown in FIG. 6, the transversal filter 32 generates a delayed wave component of a multi-path transmission line. A subtractor 36 removes the delayed wave component from the input signal x(i) that is supplied through a feed forward filter 43. A decision device 13 decides on a desired signal component and outputs the decision result as a code s(i). An error calculating portion 15 calculates an error e(i) between input and output of the decision device 13. The output of portion 15 is squared in squarer 37, and the result is sent to an updating portion 21 adopting the present invention. The updating portion 41 determines a tap coefficient vector W(i) of the transversal filter 34 so that the value of $|e|^2$ becomes minimum. In this embodiment, the feed forward filter 43 is provided on the input side. The updating portion 41 controls a coefficient H(i) of the filter 43 so that the level of the directly received wave component (desired signal component) of the input signal becomes larger than the level of the delayed wave component.

In the embodiment shown in FIG. 6, a signal s(i) for the decision feedback that is the output of the decision device 13 is fed back to the subtractor 36 through the transversal filter 34. The subtractor 36 subtracts the delayed wave component from the input signal x(i) and outputs a desired signal component. The decision device 13 decides the desired signal component and outputs the decision result as code s(i) =d(i) which constitutes code sequence. When the signal sequence sent to the transversal filter 34 with M taps is denoted by $s_m(i), s_m(i-1), \ldots, s_m(i-M+1)$ and the output of the feed forward filter 43 is denoted by x(i), the modulated wave candidate vector S(i), the auto-correlation matrix R(i), and the cross-correlation vector V(i) can be defined in the same manner. Here the single state case, m=1, is considered. Thus, the coefficient vector W(i) of the transversal filter 32 can be updated according to the updating algorithm using Expressions (2) through (11).

It should be noted that the present invention can be applied to a blind type non-linear equalizer, non-linear interference canceler, and receivers with diversity construction thereof as well as the above described non-linear equalizer.

Figure 7:
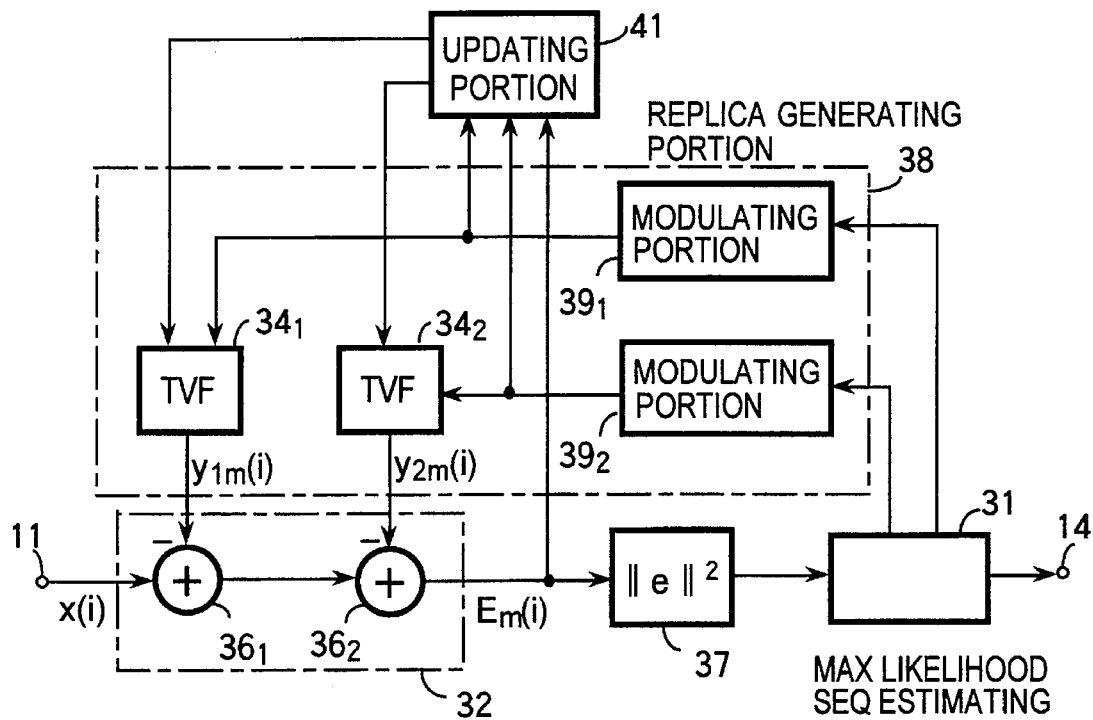
FIG. 7 is a block diagram showing a configuration of an adaptive demodulator as an interference canceler.
Figure 8:
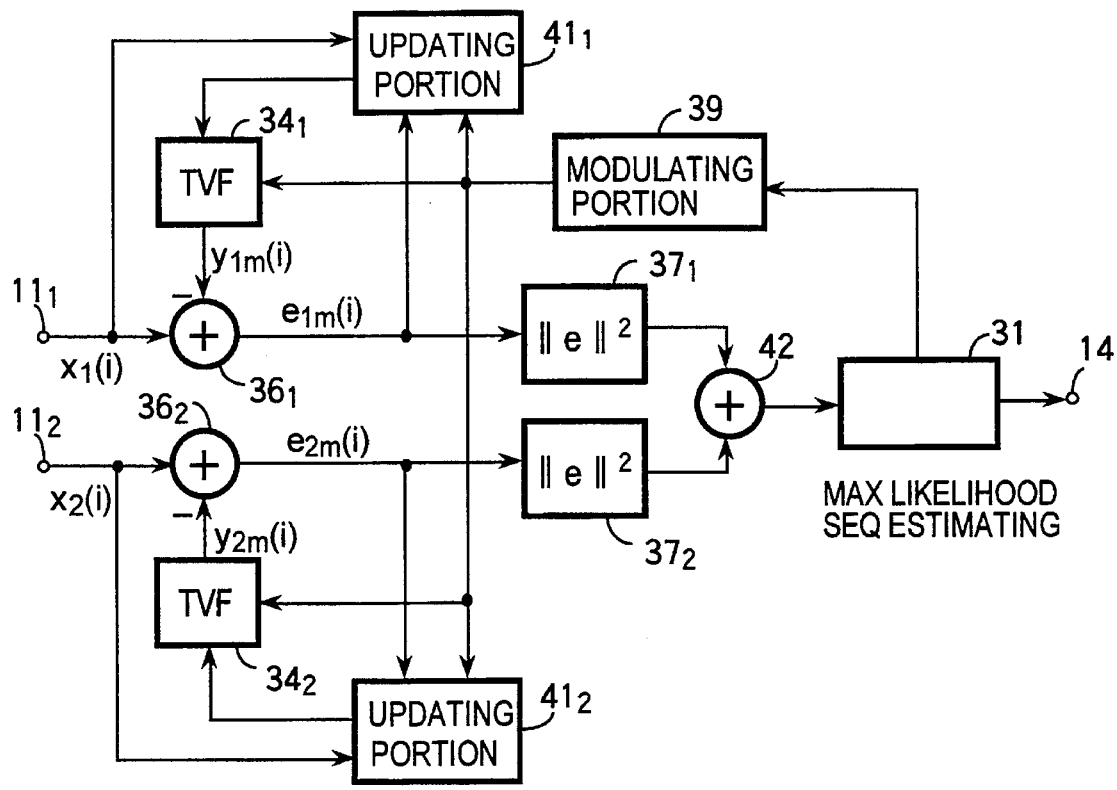
FIG. 8 is a block diagram showing a configuration of an adaptive deemodulator applied to a diversity receiver.

FIG. 7 is a block diagram showing a configuration of a non-linear interference canceler according to the demodulator of the present invention. FIG. 8 is a block diagram showing a configuration of a combination of a non-linear equalizer and a diversity receiver.

Figure 3:
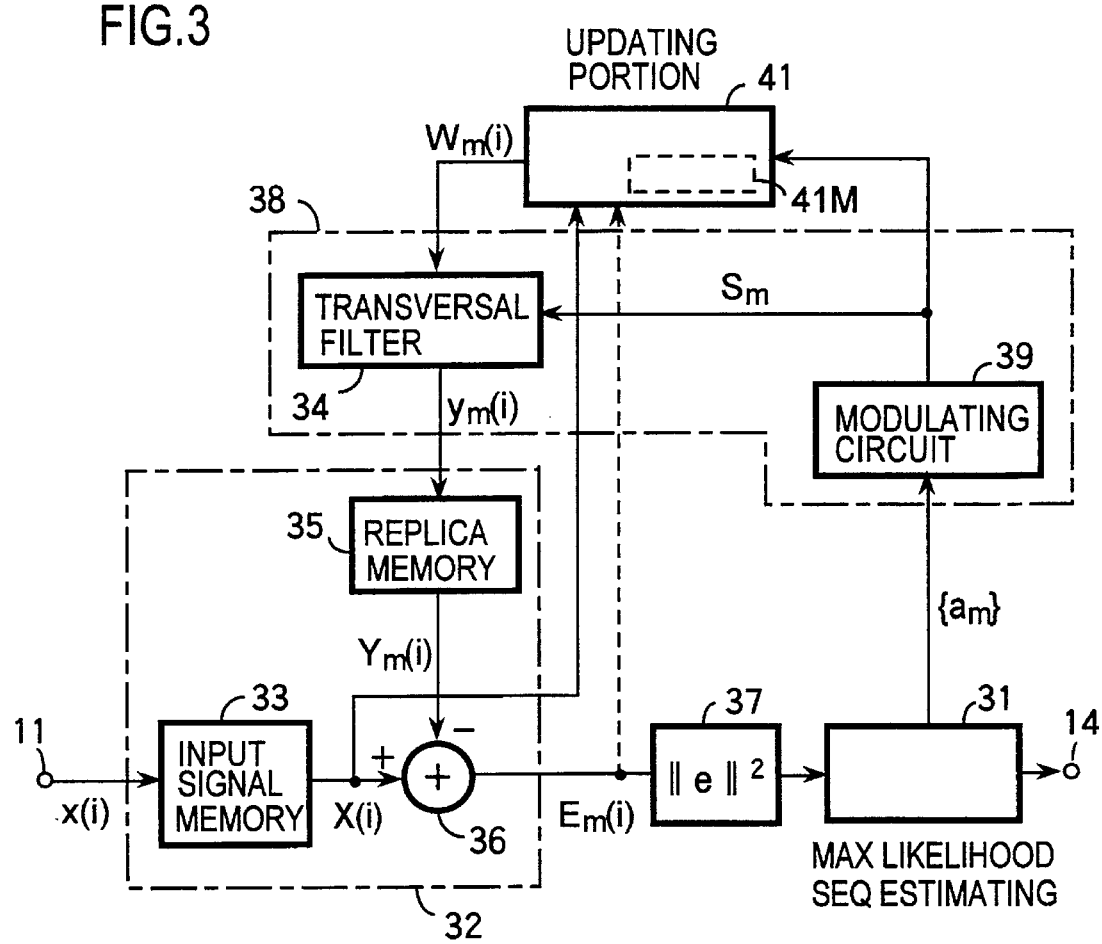
FIG. 3 is a block diagram showing a configuration of an adaptive demodulator of the present invention in the case of using a maximum likelihood sequence estimation.

The non-linear interference canceler shown in FIG. 7 consists of transversal filters $34_1$ and $34_2$, subtractors $36_1$ and $36_2$, and modulating portions $39_1$ and $39_2$ corresponding to a desired signal and an interference signal, respectively. Since N=1, the memories 33 and 35 shown in FIG. 3 are not provided. The maximum likelihood sequence estimating portion 31 successively generates sets of desired signal sequence candidates and interference signal sequence candidates and sends them to the modulating portions $39_1$ and $39_2$, respectively. The modulating portions $39_1$ and $39_2$ generate desired modulated signal sequence candidates and interference modulated signal sequence candidates and send them to the transversal filters $34_1$ and $34_2$, respectively. The updating portion 41 according to the present invention controls the tap coefficients of the transversal filters $34_1$ and $34_2$ so as to simulate the transmission characteristics of the desired signal transmission line and the interference signal transmission line. The transversal filters $34_1$ and $34_2$ output replicas of the desired signal and the interference signal to the subtractors $36_1$ and $36_2$, respectively. The subtractors $36_1$ and $36_2$ successively subtract the replicas from the input signals x(i). The finally subtracted result is defined as an error vector $E_m(i)$. The error vector $E_m(i)$ is supplied to the squarer 37. In the embodiment shown in FIG. 7, the estimated interference signal is canceled as an unnecessary signal component of the received signal x(i) so as to reduce the decision error of the desired signal.

The demodulating method given by the present invention is applicable to the diversity receiver shown in FIG. 8, where input signals $x_1(i)$ and $x_2(i)$ supplied to input terminals $11_1$ and $11_2$ from two branches, subtractors $36_1$ and $36_2$, squarers $37_1$ and $37_2$, transversal filters $34_1$ and $34_2$, and updating portions $41_1$ and $41_2$ are provided, respectively. Outputs of the squarers $37_1$ and $37_2$ are supplied to the adder 42. The added result is supplied to the maximum likelihood sequence estimating portion 31. In this embodiment, the condition of N=1 is assumed. The modulating portion 39 modulates each signal sequence candidate. The modulated signal sequence candidate is supplied commonly to the transversal filters $34_1$ and $34_2$ and the updating portions $41_1$ and $41_2$ corresponding to the two branches. The transversal filters $34_1$ and $34_2$ simulate the transmission characteristics of the received signals $x_1(i)$ and $x_2(i)$ received from two different transmission lines through the two branches and output replicas $y_{1m}(i)$ and $y_{2m}(i)$, respectively. The subtractors $36_1$ and $36_2$ output errors $E_{1m}(i)$ and $E_{2m}(i)$ between the received signals $x_1(i)$ and $x_2(i)$ and the replicas $y_{1m}(i)$ and $y_{2m}(i)$, respectively. The errors $E_{1m}(i)$ and $E_{2m}(i)$ are supplied to the squarers $37_1$ and $37_2$, respectively. These operations are described in the above mentioned references. As is clear from the drawing, each portion of this construction operates in the same manner as the above described non linear equalizer. Thus, the present invention can be easily applied to the configuration shown in FIG. 8. In each of the above described embodiments, when the number of taps M is 1, the demodulator is rendered incapable of having an equalizing function or cancelling function.

As described above, according to the present invention, an optimum coefficient vector for each signal candidate is set. Each coefficient vector is successively updated by using the Moore-Penrose generalized inverse matrix. Thus, the signal candidate can be stably obtained. In addition, since the Moore-Penrose generalized inverse matrix depends on each state transition candidate, it can be calculated beforehand and prestored in the memory. Thus, the calculation amount of the present invention is lower than that of the conventional adaptive signal processing that calculates an inverse matrix. In addition, since the maximum likelihood sequence estimating portion is provided, the signal detecting performance can be improved.

Accordingly, the receiver according to the present invention is suitable for mobile radio communications and mobile satellite communications in which fading varies at high speed. In addition, the receiver according to the present invention is suitable for micro-wave terrestrial radio communications using a high precision demodulating circuit for transmitting large amount of data. According to the present invention, adaptive receivers using adaptive equalizers, adaptive interference cancelers, and diversity construction can be easily obtained.

I claim:

1. An adaptive demodulator, comprising:

maximum likelihood sequence estimating means for generating signal sequence candidates corresponding to respective state transitions at each state for an input signal at each of discrete time points at predetermined intervals, selecting a signal sequence candidate with a high likelihood state transition from all state transitions by using an error vector, and outputting the selected signal sequence candidate;

replica generating means for generating a modulated wave candidate vector from each said signal sequence candidate supplied from said maximum likelihood sequence estimating means, and calculating the inner product of the modulated wave candidate vector and a coefficient vector corresponding to each state of said maximum likelihood sequence estimating means to generate a replica;

error calculating means for calculating the difference between a replica vector with elements of a sequence of the generated replicas and an input signal vector with elements of a sequence of the input signals; and updating means for updating the coefficient vector at the present time point i by using a generalized inverse matrix produced from a modulated wave candidate corresponding to the selected signal sequence candidate and a coefficient vector at a past time point (i−1).

2. The adaptive demodulator as set forth in claim 1, further comprising:

input signal memory means for holding input signals x(i), ..., x(i−M+1) from the time point i to a past time point (i−M+1) and outputting the input signals as an input signal vector X(i), where x(i) represents the input signal at the time point i and M represents an integer equal to or greater than 2; and replica memory means for holding M replicas $y_m(i)$, ..., $y_m(i-M+1)$ from the time point i to the past time point (i−M+1) supplied from said replica generating means and outputting the replicas as a replica vector where m represents a state transition and $y_m(i)$ represents the replica corresponding to the state transition m.

3. The adaptive demodulator as set forth in claim 2, wherein said replica generating means includes a transversal filter with M taps corresponding to M coefficients of a coefficient vector $W_m(i)$ corresponding to the transition states, said transversal filter being supplied with M elements of the modulated wave candidate vector and outputting an inner product of the M elements and the M coefficients as said replica, and wherein said updating means calculates a coefficient vector $W_m(i)$ based on the following expressions $$W_m(i)=W_m(i-1)+R_m^+(i)\Delta_m(i)$$

$$\Delta_m(i)=V_m(i)-R_m(i)W_m(i-1)$$

$$R_m(i)=A_m^H(i)A_m(i)$$

$$V_m(i)=A_m^H(i)X(i)$$

where $R_m(i)$ represents an auto-correlation matrix of the modulated wave candidate vector, $R_m^+(i)$ represents a generalized inverse matrix of $R_m(i)$, $A_m(i)$ represents a modulated wave candidate matrix with elements of the modulated wave candidate vectors S(i), ..., S(i−N+1) from the time point i to a past time point (i−N+1), N being an integer equal to or greater than 1, $A_m(i)$ represents a complex transposed matrix of $A_m(i)$ and $V_m(i)$ represents a mutual correlation vector of the modulated wave candidate vector and the input signal vector.

4. The adaptive demodulator as set forth in claim 3, wherein said updating means includes matrix memory means for storing the matrices $R_m(i)$ and $R_m^+(i)$ that are pre-calculated corresponding to the state transition m.

5. The adaptive demodulator as set forth in claim 3 or 4, wherein $\mu R_m^+(i)$ is used instead of the generalized inverse matrix $R_m^+(i)$, where $\mu$ represents a desired positive constant.

6. The adaptive demodulator as set forth in claim 2, wherein said replica generating means includes a transversal filter with M taps corresponding to M coefficients of a coefficient vector $W_m(i)$ corresponding to the transition states, the transversal filter being supplied with M elements of the modulated wave candidate vector and outputting an inner product of the M elements and the M coefficients as said replica, and wherein said updating means calculates a coefficient vector $W_m(i)$ based on the following expressions $$W_m(i)=W_m(i-1)+A_m^+(i)\Delta'_m(i)$$

$$\Delta'_m(i)=X(i)-A_m(i)W_m(i-1)$$

where $A_m(i)$ represents a modulated wave candidate matrix with elements of the N modulated wave candidate vectors $S(i), \ldots, S(i-N+1)$ from the time point i to a past time point $(i-N+1)$, and $A_m^+(i)$ represents a generalized inverse matrix of $A_m(i)$.

7. The adaptive demodulator as set forth in claim 6, wherein the error vector that is output from said error calculating means is used for the vector a $\Delta'_m(i)$.

8. The adaptive demodulator as set forth in claim 6 or 7, wherein said updating means includes a matrix memory means for storing the matrix $A_m^+(i)$ that is pre-calculated corresponding to the state transition m.

9. The adaptive demodulator as set forth in claim 6 or 7, wherein $\mu A_m^+(i)$ is used instead of the matrix $A_m^+(i)$, where $\mu$ represents a desired positive value.

10. The adaptive demodulator as set forth in claim wherein the matrix $R_m(i)$ and the vector $V_m(i)$ are defined as follows $$R_m(i)=A_m^H(i)\Lambda\,A_m(i)$$
$$V_m(i)=A_m^H(i)\Lambda\,X(i)$$
$$\Lambda=\mathrm{diag}\,(1\lambda\ldots\lambda^{N-1})$$

where N represents an integer equal to or greater than 1 and $\lambda$ represents a constant satisfying $0<\lambda<1$.

11. An adaptive demodulator, comprising:
  a transversal filter controlled by a coefficient vector to simulate a delayed wave component of an input signal, for producing a simulation delayed wave component;
  differential means for subtracting an output of said transversal filter from the input signal and outputting a desired signal component;
  deciding means for deciding the desired signal component supplied from said differential means and outputting a desired signal; and
  updating means supplied with a sequence of M desired signals from a time point i to a past time point (i−M+1) and the input signal, for calculating the coefficient vector at the time point i by using a generalized inverse matrix produced from the desired signal sequence and the coefficient vector at a time point (i−1), and supplying the coefficient vector to said transversal filter.

12. An adaptive demodulator, comprising:
  maximum likelihood sequence estimating means for generating desired signal sequence candidates and interference signal sequence candidates corresponding to respective state transitions at each state for an input signal at each of discrete time points at predetermined intervals, selecting a desired signal sequence candidate with a high likelihood state transition and an interference signal sequence candidate with a high likelihood state transition from all state transitions by using an error vector, and outputting the selected desired signal sequence candidate and interference signal sequence candidate;
  replica generating means for generating a desired modulated wave candidate vector and an interference modulated wave candidate vector from each said desired signal sequence candidate and said interfered signal sequence candidate supplied from said maximum likelihood sequence estimating means, and calculating an inner product of the desired wave candidate vector and the interference wave coefficient vector corresponding to each state of said maximum likelihood sequence estimating means to generate a desired wave replica and an interference wave replica;
  error calculating means for subtracting a desired wave replica vector with elements of a sequence of the generated desired wave replicas and an interference wave replica vector with elements of a sequence of the generated interference wave replicas from an input signal vector with elements of a sequence of the input signals to produce the error vector; and
  updating means for updating the desired wave coefficient vector at the present time point i by using a generalized inverse matrix produced from a desired modulated wave candidate corresponding to the selected desired signal sequence candidate and a desired wave coefficient vector at a past time point (i−1) and updating the interference wave coefficient vector at the present time point i by using a generalized inverse matrix produced from an interference modulated wave candidate corresponding to the selected interference signal sequence candidate and an interference wave coefficient vector at the past time point (i−1).

13. An adaptive demodulator, comprising;
  maximum likelihood sequence estimating means for generating signal sequence candidates corresponding to respective state transitions at each state for first and second input signals supplied from first and second branches at each of discrete time points at predetermined intervals, selecting signal sequence candidates with high likelihood state transitions from all state transitions, and outputting the selected signal sequence candidates;
  first and second replica generating means for generating modulated wave candidate vectors from each signal sequence candidate received from said maximum likelihood sequence estimating means, and calculating an inner product of the modulated wave candidate vectors and first and second coefficient vectors corresponding to each state of said maximum likelihood sequence estimating means to generate first and second replicas;
  first error calculating means for calculating the difference between a first replica vector with elements of a sequence of the first replicas and a first input signal vector with elements of a sequence of the first input signals to generate a first error vector;
  second error calculating means for calculating the difference between a second replica vector with elements of a sequence of the second replicas and a second input signal vector with elements of a sequence of the second input signals to generate a second error vector;
  likelihood generating means for calculating the sum of norms of the first and second error vectors as a signal corresponding to the likelihood and supplying the signal to said maximum likelihood sequence estimating means; and
  first and second updating means for updating the first and second coefficient vectors at the present time point i by using a generalized inverse matrix produced from a modulated wave candidate corresponding to the selected signal sequence candidate and the first and second coefficient vectors at the past time point (i−1).

14. An adaptive demodulating method for generating a replica, comprising the steps of:
  (1) providing a signal sequence candidate corresponding to a state transition for each state from maximum likelihood sequence estimating means to replica generating means;
  (2) generating by the replica generating means, a modulated wave candidate vector from a signal sequence candidate corresponding to the state transition and calculating an inner product of the modulated wave candidate vector and a coefficient vector corresponding to each state of the maximum likelihood sequence estimating means to produce a replica;

(3) generating by error calculating means, a replica vector with elements of a sequence of generated replicas and an input signal vector with elements of a sequence of input signals, and producing a difference between these vectors as an error vector;

(4) causing the maximum likelihood sequence estimating means to select a high likelihood state transition candidate from the error signal sequences corresponding to the state transitions for each state and output a decided signal corresponding to the most likelihood state; and (5) causing updating means to calculate the inner product of a generalized inverse matrix produced from a modulated wave candidate corresponding to the selected state transition and the error vector and update the coefficient vector with the inner product for each state.

15. The demodulating method as set forth in claim 12, wherein in said step (5) said updating means calculates a coefficient vector $W_m(i)$ based on the following expressions:

$$W_m(i)=R_m^+(i)V_m(i)+(I_M-R_m^+(i)R_m(i))Wr$$

$$R_m(i)=A_m^H(i)A_m(i)$$

$$V_m(i)=A_m^H(i)X(i)$$

$$Wr \neq 0$$

where $x(i)$ represents an input signal at a time point i, $X(i)$ represents an input signal vector with elements of input signals $x(i), \ldots, x(i-M+1)$ from the time i to a past time point $(i-M+1)$, M represents an integer equal to or greater than 1; m represents a state transition, $W_m(i)$ represents a coefficient vector with elements of coefficients $w_1(i), \ldots, w_M(i)$ corresponding to the state transition m; Wr represents any vector with the same dimensions as $W_m(i)$, $R_m(i)$ represents an auto-correlation matrix of the modulated wave candidate vector, $R_m^+(i)$ represents a generalized inverse matrix of $R_m(i)$, $I_M$ represents an M×M unit matrix, $A_m(i)$ represents a modulated wave candidate matrix with elements of up to N modulated wave candidate vectors $S(i), \ldots, S(i-N+1)$ from the time point i to the past time point $(i-N+1)$, N being 1 or greater, $A_m^H(i)$ represents a complex transposed matrix of $A_m(i)$, and $V_m(i)$ represents a mutual correlation vector of the modulated wave candidate vector and the input signal vector.

16. The demodulating method as set forth in claim 14, wherein in said step (5) said updating means calculates the coefficient vector $W_m(i)$ based on the following expressions:

$$W_m(i)=W_m(i-1)+R_m^+(i)\Delta_m(i)$$

$$\Delta_m(i)=V_m(i)-R_m(i)W_m(i-1)$$

$$R_m(i)=A_m^H(i)A_m(i)$$

$$V_m(i)=A_m^H(i)X(i)$$

where $x(i)$ represents an input signal at the time point i, $X(i)$ represents an input signal vector with elements of complex conjugation of input signals $x(i), \ldots, x(i-M+1)$ from the time point i to a past time point $(i-M+1)$, M represents an integer equal to or greater than 1, m represents a state transition, $W_m(i)$ represents a coefficient vector with elements of coefficients $w_1(i), \ldots, w_M(i)$ corresponding to the state transition m, $R_m(i)$ represents an auto-correlation matrix of $R_m(i)$ the modulated wave candidate vector, $R_m^+(i)$ represents a generalized inverse matrix of, $R_m(i)A_m(i)$ represents a modulated wave candidate matrix with elements of the N modulated wave candidate vectors $S(i), \ldots, S(i-N+1)$ from the time point i to a past time point $(i-N+1)$, N being an integer equal to or greater than 1, $A_m^H(i)$ represents a complex transposed matrix of $A_m(i)$, and $V_m(i)$ represents a mutual correlation vector of the modulated wave candidate vector and the input signal vector.

17. The demodulating method as set forth in claim 15 or 16 wherein the matrices $R_m(i)$ and $R_m^+(i)$ are pre-calculated and prestored in matrix memory means, and wherein said step (5) is performed in response to the designation of the state transition candidate m by reading out the matrixes $R_m(i)$ and $R_m^+(i)$ corresponding to the designation of the state transition candidate m from the matrix memory means so as to be used for calculating the coefficient vector.

18. The demodulating method as set forth in claim 15, wherein in said step (5) said updating means calculates the coefficient vector $W_m(i)$ based on the following expressions:

$$W_m(i)=W_m(i-1)+A_m^+(i)\Delta'_m(i)$$

$$\Delta'_m(i)=X_m(i)-A_m(i)W_m(i-1)$$

where $x(i)$ represents an input signal at the time point i, $X(i)$ represents an input signal vector with elements of complex conjugation of input signals $x(i), \ldots, x(i-M+1)$ from the time point i to a past time point $(i-M+1)$, M represents an integer equal to or greater than 2 m represents a state transition; $W(i)$ represents a coefficient vector with elements of coefficients $w_1(i), \ldots, w_M(i)$, $A_m(i)$ represents a modulated wave candidate matrix with elements of the modulated wave candidate vectors $S(i), \ldots, S(i-N+1)$ from the time point i to a past time point $(i-N+1)$, and $A_m^+(i)$ represents a general inverse matrix of $A_m(i)$.

19. The demodulating method as set forth in claim 18, wherein the error vector that is output from the error calculating means is used for the vector $\Delta'_m(i)$.

20. The demodulating method as set forth in claim 18 or 19, wherein the matrix $A_m^+(i)$ pre-calculated corresponding to the state transition candidate m is prestored in matrix memory means; and wherein said step (5) is performed in response to the designation of the state transition candidate m by reading out the matrix $A_m^+(i)$ corresponding to the designation of the state transition candidate from said matrix memory means so as to be used for calculating the coefficient vector.

21. The demodulating method as set forth in claim 16 or 18, wherein $\mu A_m^+(i)$ is used instead of the matrix $A_m^+(i)$ where $\mu$ represents a desired positive value.

22. The demodulating method as set forth in claim 16, wherein the matrix $R_m(i)$ and the vector $V_m(i)$ are defined as follows $$R_m(i)=A_m^H(i)\Lambda A_m(i)$$

$$V_m(i)=A_m^H(i)\Lambda X(i)$$

$$\Lambda=\text{diag}(1\ \lambda \ldots \lambda^{N-1})$$

where N represents an integer equal to or greater than 1 and $\lambda$ represents a constant satisfying $0<\lambda<1$.

* * * * *